United States Patent [19]
Mehls

[11] Patent Number: 5,862,966
[45] Date of Patent: Jan. 26, 1999

[54] CARRIER AND BICYCLE MOUNT APPARATUS FOR VEHICLES

[75] Inventor: William L. Mehls, 13200 98th Ave., Chippewa Falls, Wis. 54729

[73] Assignee: William L. Mehls, Chippewa Falls, Wis.

[21] Appl. No.: 811,763

[22] Filed: Mar. 6, 1997

[51] Int. Cl.⁶ .................................................. B60R 9/045
[52] U.S. Cl. ......................... 224/504; 224/506; 224/524; 224/527; 224/537; 224/917.5; 224/924
[58] Field of Search .......................... 224/282, 502–509, 224/518–522, 523, 524, 528, 529, 530, 525, 526, 527; 414/462, 924, 917.5, 527, 537

[56] References Cited

U.S. PATENT DOCUMENTS

| | | | |
|---|---|---|---|
| 1,718,205 | 6/1929 | McNear | 224/524 |
| 3,724,694 | 4/1973 | Wilson | 224/526 |
| 3,796,333 | 3/1974 | Goldstein | 224/526 |
| 4,089,448 | 5/1978 | Traeger | 24/42.03 B |
| 4,189,074 | 2/1980 | Davies | 224/42.06 |
| 4,352,515 | 10/1982 | Schumacher | 224/924 |
| 4,381,069 | 4/1983 | Kreck | 224/502 |
| 4,394,948 | 7/1983 | Graber | 224/314 |
| 4,403,716 | 9/1983 | Carlson et al. | 224/42.08 |
| 4,830,250 | 5/1989 | Newbold et al. | 224/314 |
| 4,856,686 | 8/1989 | Workentine | 224/42.07 |
| 4,976,386 | 12/1990 | Geiger | 224/42.45 R |
| 4,997,116 | 3/1991 | Grim | 224/42.03 B |
| 5,018,651 | 5/1991 | Hull et al. | 224/282 |
| 5,054,673 | 10/1991 | Dixon | 224/324 |
| 5,056,699 | 10/1991 | Newbold et al. | 224/314 |
| 5,067,641 | 11/1991 | Johnson et al. | 224/42.03 B |
| 5,094,373 | 3/1992 | Lovci | 224/282 |
| 5,169,042 | 12/1992 | Ching | 224/42.45 R |
| 5,190,195 | 3/1993 | Fullhart et al. | 224/506 |
| 5,195,670 | 3/1993 | Piretti et al. | 224/321 |
| 5,211,323 | 5/1993 | Chimenti et al. | 224/314 |
| 5,232,135 | 8/1993 | Marren | 224/525 |
| 5,303,857 | 4/1994 | Hewson | 224/42.03 B |
| 5,330,084 | 7/1994 | Peters | 224/506 |
| 5,360,151 | 11/1994 | Fine | 224/310 |
| 5,363,996 | 11/1994 | Raaber et al. | 224/314 |
| 5,439,151 | 8/1995 | Clayton | 224/282 |
| 5,443,189 | 8/1995 | Hirschfeld | 224/507 |
| 5,476,202 | 12/1995 | Lipp | 224/532 |
| 5,497,927 | 3/1996 | Peterson | 224/523 |
| 5,536,130 | 7/1996 | Edensor | 224/509 |
| 5,544,799 | 8/1996 | Didlake | 224/282 |
| 5,620,126 | 4/1997 | Janek | 224/282 |
| 5,664,717 | 9/1997 | Joder | 224/509 |
| 5,690,260 | 11/1997 | Aikins et al. | 224/505 |

*Primary Examiner*—Allan N. Shoap
*Assistant Examiner*—Gregory M. Vidovich
*Attorney, Agent, or Firm*—Mueting, Raasch & Gebhardt, P.A.

[57] ABSTRACT

A mounting apparatus for use at the rear of a vehicle having a hitch element includes an object support platform. The object support platform includes an platform section lying generally in a plane for positioning of an object thereon. The object support platform further includes a support member. The mounting apparatus further includes a hitch member which includes a position locking and coupling device connected to a portion of the hitch member for adjustably coupling a portion of the elongated support member such that the plane in which the platform section generally lies is adjustable to a plurality of positions at the rear of the vehicle. The platform section may be for supporting a carrier receptacle or one or more bicycles.

18 Claims, 10 Drawing Sheets

CARRIER AND BICYCLE MOUNT APPARATUS FOR VEHICLES

FIELD OF THE INVENTION

The present invention relates to apparatus for mounting carriers and bicycles at the rear of vehicles.

BACKGROUND OF THE INVENTION

Many motor vehicles have roofs that are unable to support loads or roofs that are difficult to reach and mount objects thereon without the use of ladders, stepping elements, etc. For example, some vehicle roofs are relatively high compared to many other vehicles. As a result, it is inconvenient to carry objects on the roofs of such vehicles.

Likewise, many vehicles, such as vans, various panel trucks, etc., have rear doors that swing outwardly, i.e., rearwardly to the side, from the vehicle. As a result of such rearwardly swinging doors, it is not possible to mount carriers or racks at the rear of the vehicles without making it difficult to utilize the rearwardly swinging doors.

There are various prior art mounting apparatus for mounting carriers used to protect objects therein from the environment in order to transport articles such as skis, luggage, etc. and mounting bicycles on vehicles. However, such carrier mounts do not adequately solve the problems as described above. Moreover, such mounting apparatus do not adequately and effectively provide mounting apparatus that firmly and rigidly hold the objects while the vehicle is being driven. In addition, such apparatus for mounting bicycles do not take into consideration that bicycles come in various forms. For example, many of the available bicycle racks do not provide for the differences between men's and women's bicycle designs, i.e., such as the cross bar differences.

For the above reasons, there is a need in the art for improved mounting apparatus capable of carrying objects, such as bicycles and skis. In addition, apparatus for use with vehicles having rearwardly swinging doors is needed. The present invention, as described below, overcomes the problems described above and other problems which will become apparent to one skilled in the art from the detailed description below.

SUMMARY OF THE INVENTION

A mounting apparatus in accordance with the present invention for use at the rear of a vehicle having a hitch element is described. The apparatus includes an object support platform. The object support platform includes a platform section lying generally in a first plane for positioning of an object thereon. The object support platform further includes a support member having a first end portion connected to the platform section and extending therefrom in a second plane that is perpendicular to the first plane. The support member further includes a second end portion generally opposite the first end portion thereof. The mounting apparatus further includes a hitch member. The hitch member includes a first elongated hitch element having a first end and a second end. The first end of the first elongated hitch element is used for secure engagement with the hitch element of the vehicle. The hitch member further includes a second elongated hitch element having a first end connected to the second end of the first elongated hitch element. The second elongated hitch element extends substantially perpendicularly from the first elongated hitch element. The second elongated hitch element further includes a second end opposite the first end thereof. The hitch member further includes a position locking and coupling device connected to a portion of the second elongated hitch element at the second end thereof for adjustable coupling with the second end portion of the support member such that the first plane in which the platform section generally lies is adjustable to a plurality of positions relative to a ground surface when the hitch member is engaged with the hitch element of the vehicle.

In one embodiment of the apparatus, the plurality of positions includes a first position wherein the platform section is substantially parallel to the ground surface and a second position wherein the platform section is substantially vertical relative to the ground surface. In a further embodiment of the apparatus, the plurality of positions further include a third position wherein the platform section is at an angle relative to the ground surface.

Another mounting apparatus in accordance with the present invention for use at the rear of a vehicle having a hitch element is also described. The apparatus includes a support platform lying generally in a first plane for receiving an elongated substantially rectangular carrier receptacle on a receiving side thereof. The support platform is connected to a crossing member of a T-shaped element. The T-shaped element further includes an elongated support element having a first and second end with the crossing member connected at the first end thereof. Further, an axis of the elongated support element lies at an angle less than 90 degrees relative to the first plane. The mounting apparatus also includes a hitch member. The hitch member includes a first elongated hitch element having a first end and a second end. The first end is for secure engagement with the hitch element of the vehicle. The hitch member further includes a second elongated hitch element extending perpendicularly from the second end of the first elongated hitch element. The second elongated hitch element terminating in a position locking and coupling device for adjustable coupling with the second end of elongated support element such that the support platform lying generally in the first plane is adjustable to a plurality of positions relative to a ground surface when the hitch member is engaged with the hitch element of the vehicle.

In yet another mounting apparatus in accordance with the present invention, the apparatus includes a hitch member having a first end and a second end. The first end is for secure engagement with a hitch element at the rear of a vehicle. The hitch member further includes a coupling device at the second end of the hitch member. The mounting apparatus further includes a support platform including one or more channel rails. Each channel rail for receiving tires of a bicycle in a channel thereof. Each channel rail also includes a first tire restraint for restraining a first tire of a bicycle in a portion of the channel at one end of the channel rail and a second tire restraint movable relative to the channel rail and lockable to a position therein such that a second tire of the bicycle is held in a portion of the channel at the second end of the channel rail. The support platform has a support element extending therefrom and terminating in a coupling end for coupling with the coupling device at the second end of the hitch member.

A method of mounting objects in accordance with the present invention at the rear of a vehicle having a hitch element includes engaging a first end portion of a hitch member with the hitch element of the vehicle. The hitch member also includes a position locking and coupling device. The method further includes adjustably coupling a support member extending from a platform section with the position locking and coupling device such that the platform section generally defined by a first plane is adjustable to a plurality of positions relative to a ground surface. Further, the first plane is perpendicular to a second plane generally defined by the rear of the vehicle at each of the plurality of positions.

DETAILED DESCRIPTION OF THE EMBODIMENTS

Figure 1:
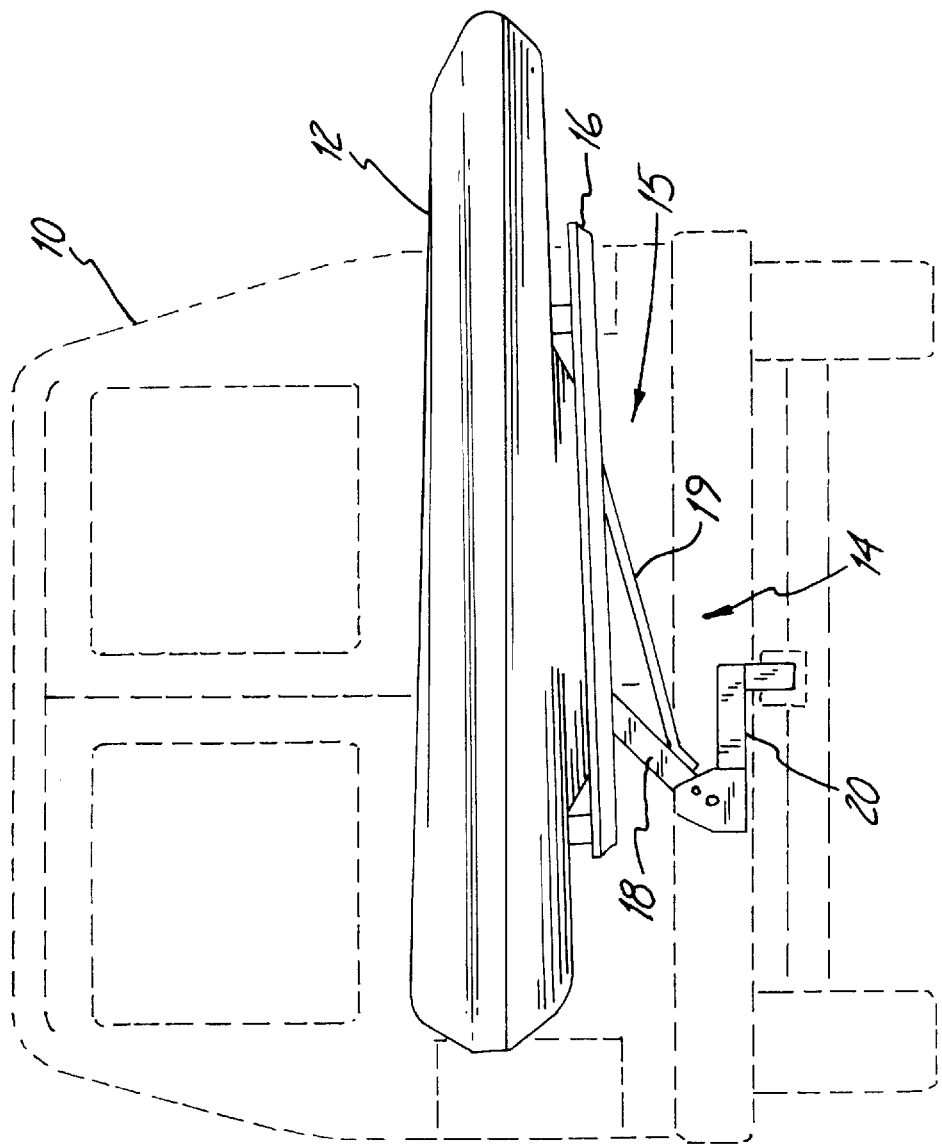
FIG. 1 is a side view of a carrier mounting apparatus in accordance with the present invention mounted at the rear of a vehicle and shown in a carrier loading position.

The present invention shall first be described with reference to FIGS. 1–7 illustrating a carrier mounting apparatus 14 for mounting a carrier 12, such as for carrying skis, poles, luggage, or other objects, at the rear of a vehicle 10. The carrier mounting apparatus 14 includes a hitch member 20 having one end portion 28 (FIG. 4) that can be simply slipped into place within a two-inch or a one and one-quarter-inch standard hitch 9 of vehicle 10. The hitch member 20 is secured in hitch 9 with a locking cross pin or other locking device. Such standard tow packages are incorporated on many vehicles. Various other hitch packages may be utilized for which the present invention may be adapted as would be known to one skilled in the art.

Figure 2:
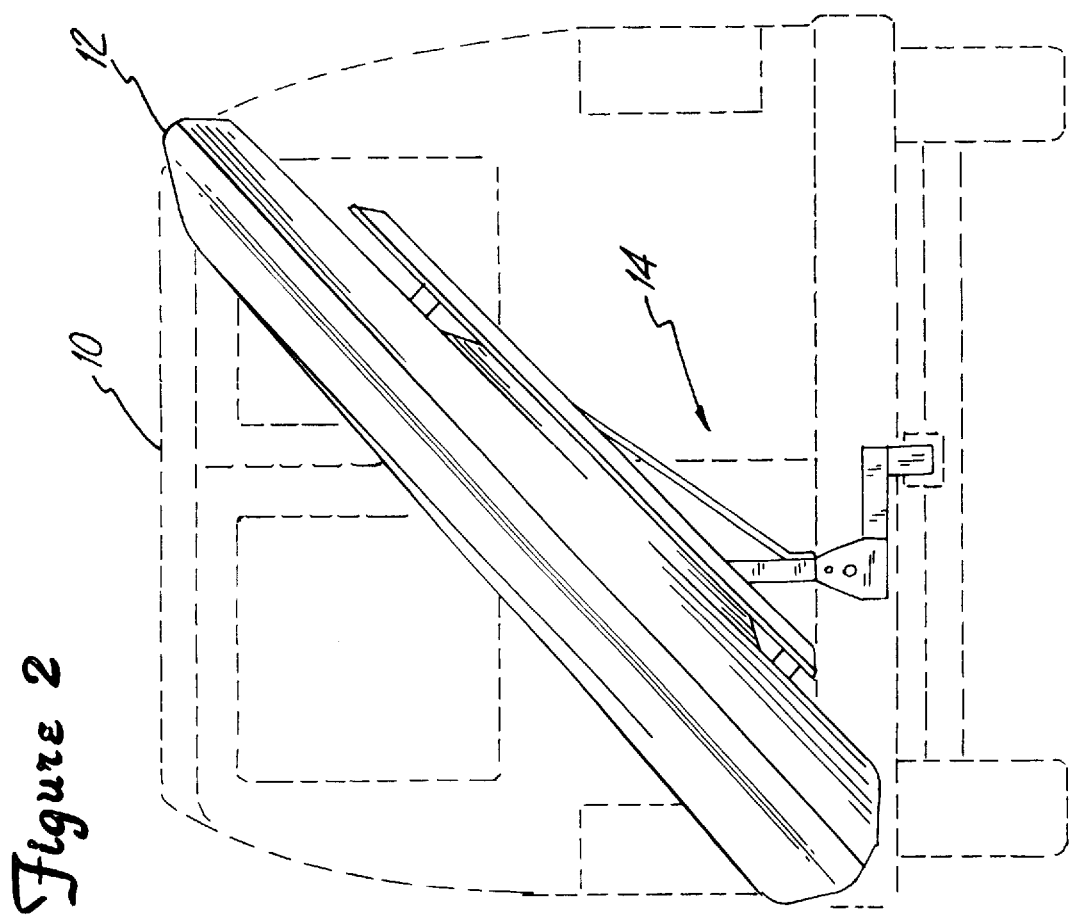
FIG. 2 is the carrier mounting apparatus of FIG. 1 mounted to the rear of the vehicle and shown in a carrier traveling position.
Figure 3:
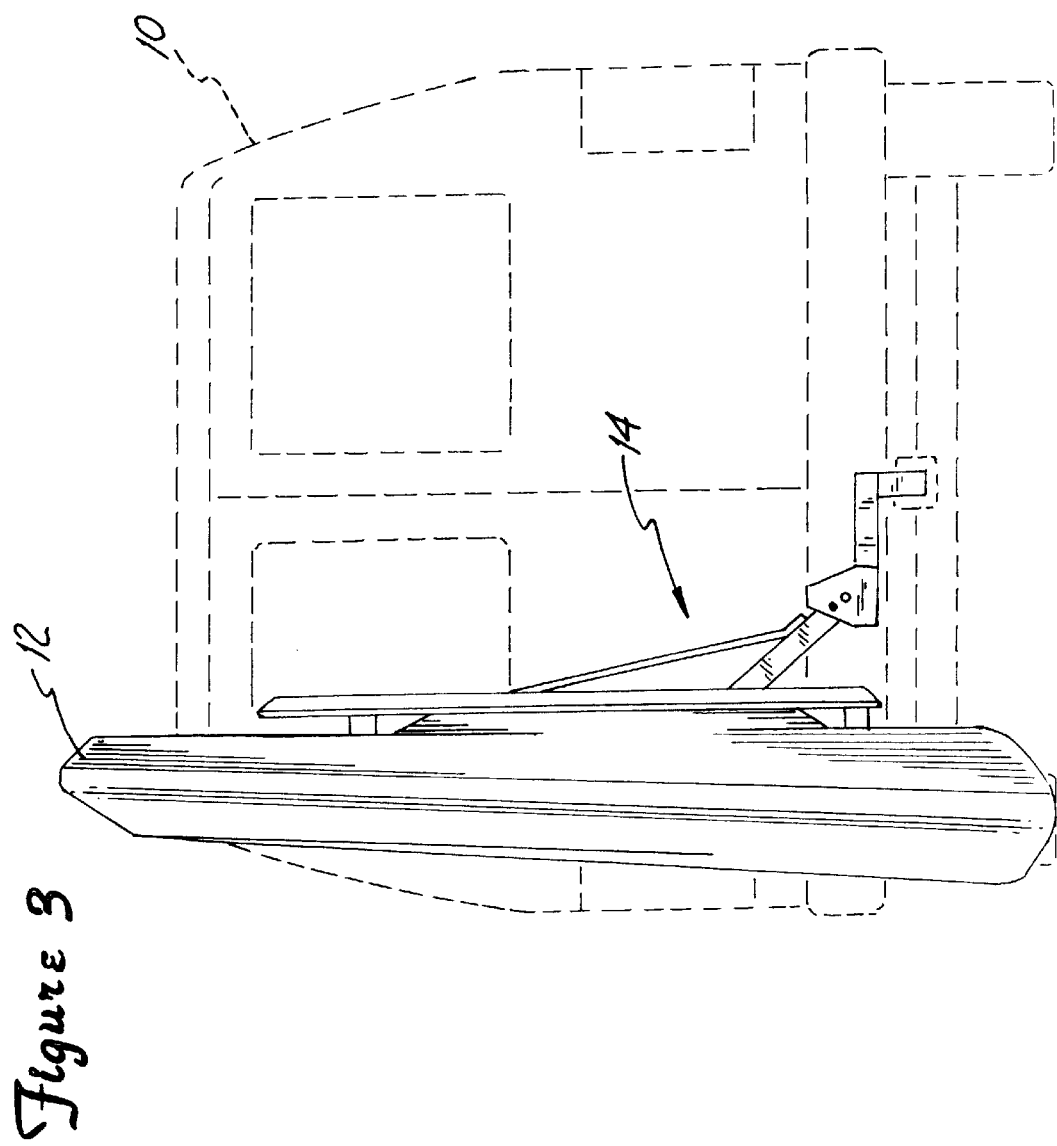
FIG. 3 is the carrier mounting apparatus of FIG. 1 mounted at the rear of the vehicle and shown in a vehicle entry position.

In addition to the hitch member 20, the carrier mounting apparatus 14 includes carrier platform support 15 which is adjustably coupled to hitch member 20 such that the carrier 12 supported by the carrier platform support 15 is adjustably moved into a number of various positions at the rear of vehicle 10. For example, as shown in FIG. 1, the carrier 12 is positioned at a generally horizontal position relative to the ground surface, i.e., any surface upon which the vehicle may move, which is generally defined as a planar surface. The carrier 12 is positioned at generally about a 45° angle in a carrier traveling position as shown in FIG. 2. However, the angle may be any angle between vertical and horizontal, although the angle is preferably 45°. Further, the carrier 12 is shown in a substantially vertical position relative to the ground in a vehicle entry position as shown in FIG. 3. In the carrier loading position, which is generally horizontal to the ground (i.e., ground and ground surface being used interchangeably), the carrier 12 can be easily loaded. In the carrier traveling position, as shown in FIG. 2, the carrier 12 is positioned at an angle with respect to the surface upon which the vehicle 10 is traveling so as to minimize movement of the carrier and carrier mounting apparatus and reduce the amount of air resistance as the vehicle 10 is traveling, i.e., the carrier in the vertical or horizontal position being of a length resulting in air resistance. As shown in FIG. 3, the carrier 12 is positioned such that a door of the vehicle 10 can be swung to the side and rearwardly in a useable manner.

Figure 4:
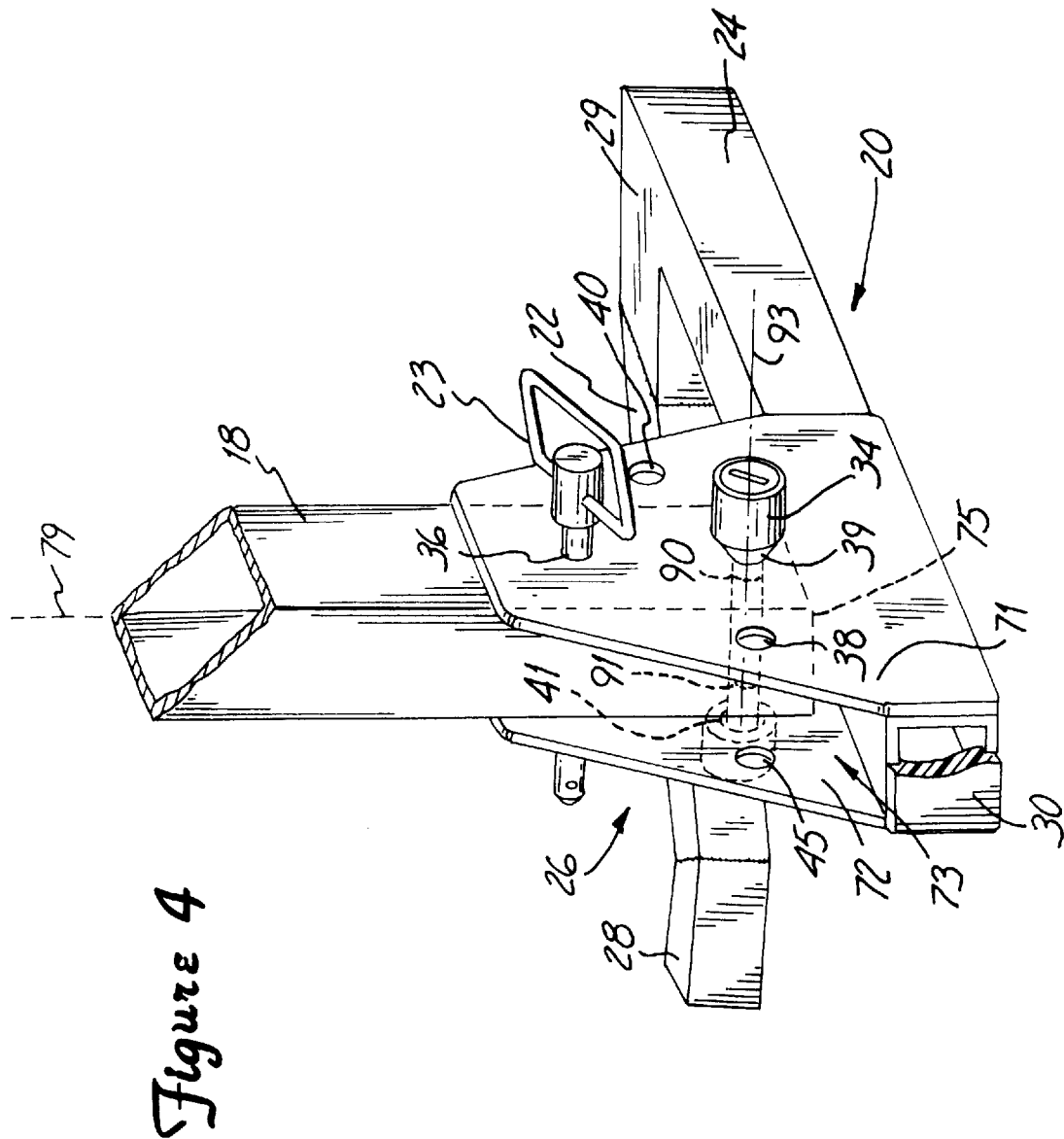
FIG. 4 is an enlarged perspective view of a hitch member of the carrier mounting apparatus shown in FIG. 1 in accordance with the present invention.

As shown in FIG. 4, the hitch member 20 of the carrier mounting apparatus 14 includes a generally L-shaped member. The L-shaped member includes a first member 22 which includes end portion 28 for insertion into the standard-type hitch 9. The first member 22, when mounted in the hitch, extends substantially perpendicular to a plane formed by the rear of the vehicle 10. A second member 24 of the L-shaped member extends generally in a perpendicular direction from a second end portion 29 of the first member 22 and in a plane which is parallel to the plane established by the rear of the vehicle 10. Further, the second member 24 extends from the first member so as to be in a plane parallel to the ground. The first member 22 or second member 24 may be straight or may have a bend therein (FIG. 4) for providing clearance advantages. Further, the first member 22 and the second member 24 may be an integral member or separate members welded together or otherwise connected. These members 22, 24 may be formed of square tubular steel or any other strengthened metal or metal alloy.

At an end portion 30 of the second member 24, the hitch member 20 includes a position locking and coupling device 26. The position locking and coupling device 26 includes two parallel plates 71, 72 extending from respective sides of second member 24 of hitch member 20 at end portion 30 thereof. The two parallel plates 71, 72 generally form a channel 73 which extends parallel to the plane established by the rear of the vehicle 10 and perpendicular to the ground surface. The channel 73 is sized for receiving a support element 18 of the carrier platform support 15.

Support element 18 includes openings therein at one end portion 75 thereof which correspond with openings in the parallel plates 71, 72 such that the support element 18 can be adjustably positioned as desired in the channel 73 in order to hold the carrier 12, and therefore platform 16, in positions such as shown in FIGS. 1–3. Parallel plates 71, 72 include openings 39, 41 respectively therein which correspond to openings 90, 91 in support element 18 such that a locking pin 34, as is typically and conventionally known to one skilled in the art, can be inserted therethrough. When the locking pin 34 is inserted therethrough and locked, the support element 18 has substantially a 180° freedom of rotation about an axis 93 of locking pin 34. This allows for the positioning of a number of other openings such that a removable positioning pin 23 can be inserted therethrough in order to achieve and lock the positions as shown in FIGS. 1–3, or an general desired position allowed by the generally 180° freedom of rotation.

As illustrated in FIG. 4, removable positioning pin 23 is inserted into hole 36 and through corresponding holes in support element 18 and plate 72 such that the support element 18 is held generally perpendicular to the second member 24 of hitch member 20, and therefore, generally perpendicular to the ground. With the positioning pin 23 in this location, the carrier 12 is held at an angle of about 45° across the rear of vehicle 10 as shown in the carrier traveling position of FIG. 2. Likewise, movable positioning pin 23 may be inserted in hole 40 of plate 71, through the positioning holes in support element 18, and through a corresponding hole in plate 72 such that the carrier 12 may be held in a position that is generally parallel to the ground as shown in the carrier loading position of FIG. 1. In the same manner, the movable positioning pin 23 may be inserted in hole 38, through the holes of the support element 18, and through corresponding hole 45 in plate 72. With movable positioning pin 23 inserted in such a manner, the carrier 12 is generally held in a vertical position relative to ground as shown in the vehicle entry position of FIG. 3. It will be readily apparent to one skilled in the art that the positions of the carrier 12 may be easily modified by repositioning the openings in the parallel plates such that the positioning pin 23 inserted therethrough holds the carrier at a variety of positions. Further, other coupling devices which allow for the rotation and locking of the platform as described herein are contemplated in accordance with the present invention as described in the accompanying claims.

Figure 5:
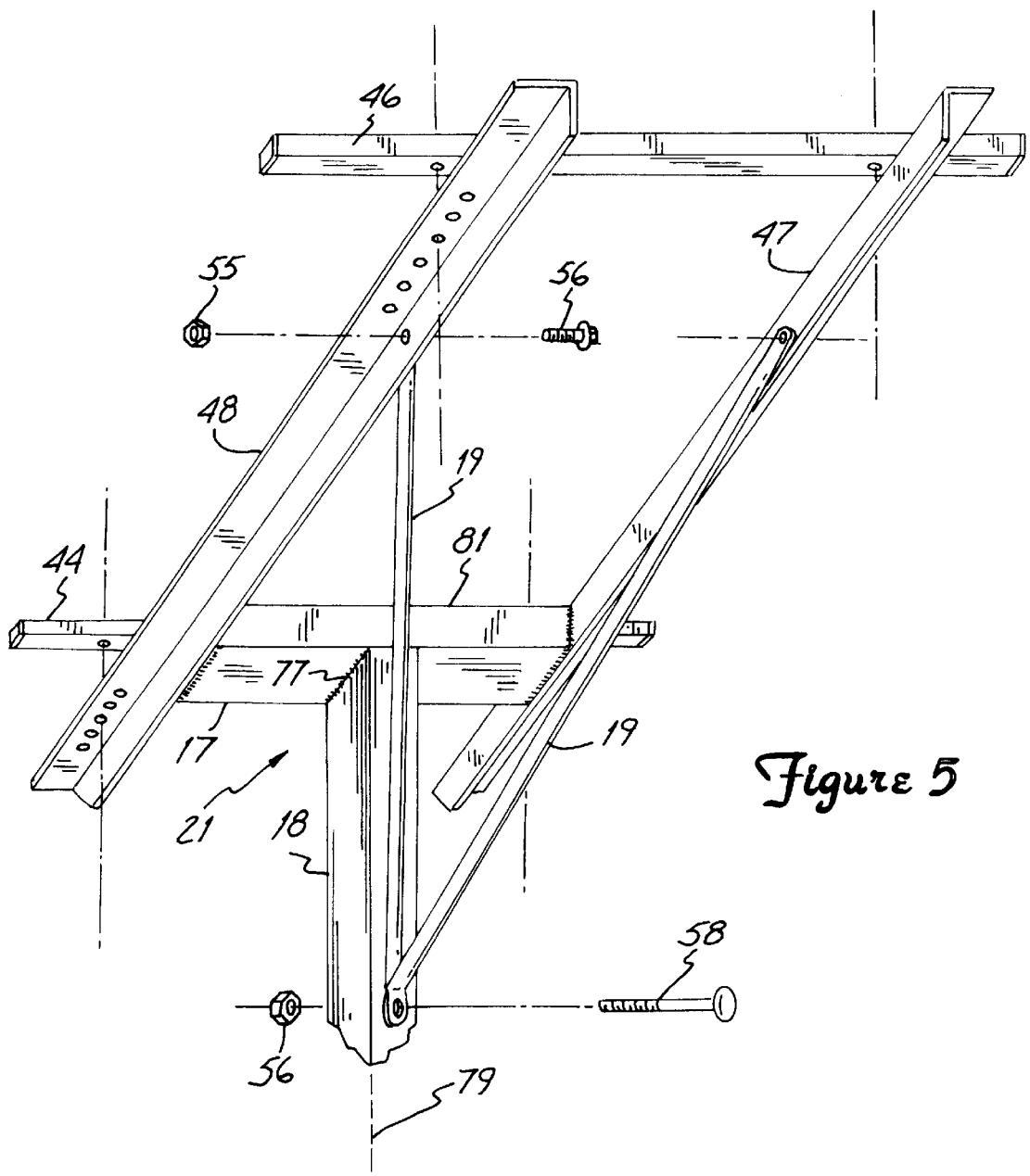
FIG. 5 is a perspective view of a portion of the carrier platform support of the carrier mounting apparatus shown in FIG. 1 in accordance with the present invention.

As shown in the perspective view of FIG. 5, carrier platform support 15 includes a generally T-shaped member 21 including the support element 18 and a crossing member 17 lying substantially perpendicular to the support element 18. The generally T-shaped member 21, as shown in FIG. 4, is adjustably coupled at end portion 75 of the support element 18 to the position locking and coupling device 26. The T-shaped member 21 is utilized for mounting and supporting platform 16 upon which carrier 12 is positioned and mounted. Further, as is best seen in the view shown in FIGS. 1–3, the end 77 of support element 18 is angled relative to an axis 79 through support element 18, i.e., the end cut 77 of support element 18 is not perpendicular to axis 79 therethrough. The crossing member 17 is welded to support element 18 at the angled end 77. A top surface 81 of the crossing member 17 is generally horizontal, and therefore the platform is parallel to the ground, in the carrier loading position (FIG. 1).

Figure 6:
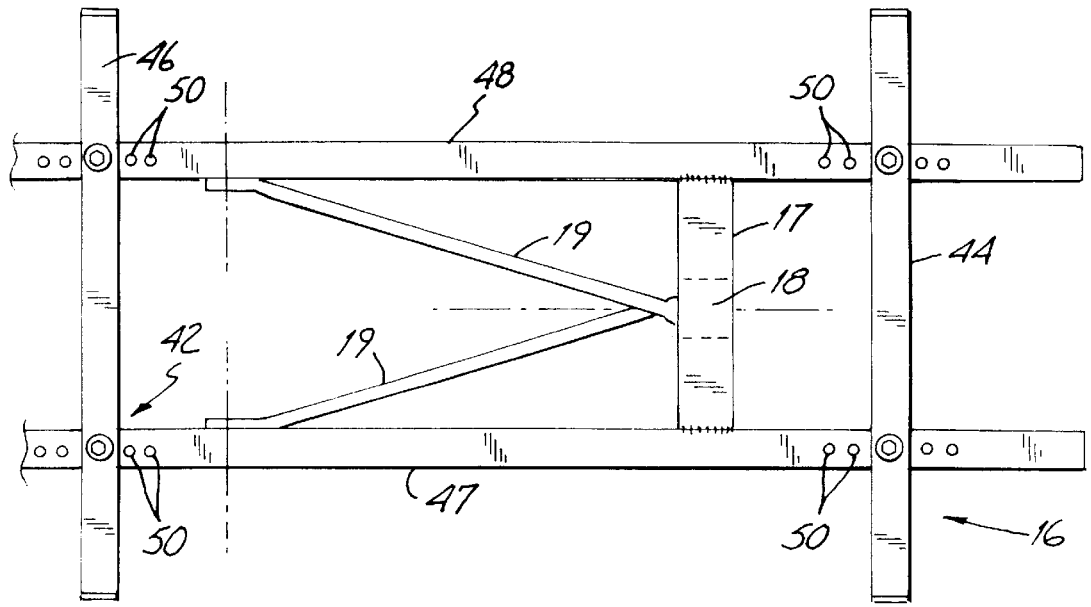
FIG. 6 is a top view of a portion of the carrier platform support of the carrier mounting apparatus of FIG. 5 in accordance with the present invention.
Figure 7:
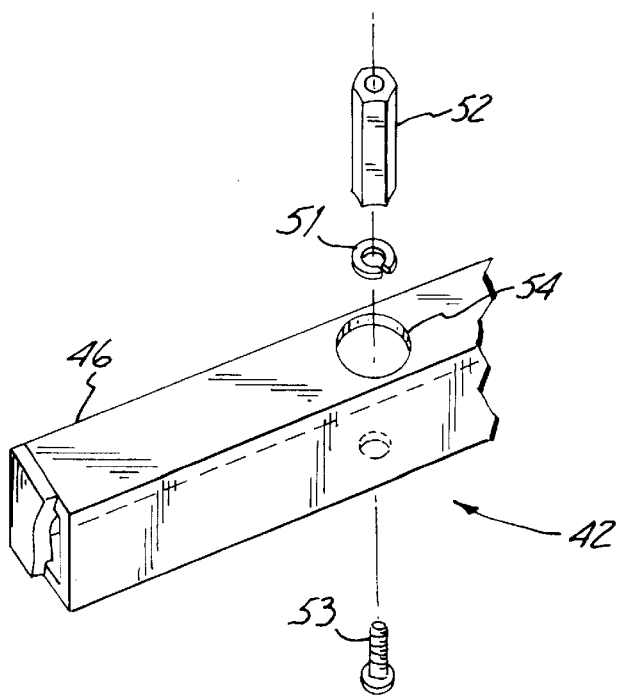
FIG. 7 is a more detailed perspective view of a fastener mechanism utilized with the carrier platform support of FIG. 6 in accordance with the present invention.

As further shown in FIGS. 5 and 6, the carrier platform support 15 includes platform 16 formed by generally four platform elements 44, 46, 47, and 48. Typically, carrier 12 is an elongated carrier (although any size carrier may be accommodated) and thus the platform formed by such elements include two platform elements 47, 48 which are longer than two crossing platform elements 44, 46. The platform elements 47, 48 are welded to crossing member 17 parallel to one another. Crossing platform elements 44, 46 are connected to the platform elements 47, 48 to form a generally rectangular platform by utilizing any commonly available fastening elements such as nuts and bolts, rivets, etc. As shown in the detail of FIG. 7, preferably crossing elements 44, 46 are connected to platform elements 47, 48 by a fastening technique shown generally at reference 42 which prevents the removal of a carrier when secured to the crossing elements over the holes 54 (FIG. 7). A conventional ski carrier can be easily attached to the crossing elements 44, 46 by conventional fastening mechanisms. For example, conventional carriers come with attachments for use in fastening the carrier to the crossing elements 44, 46. It should be apparent that any number of elements may be used to form the platform 16 for receiving a carrier. The platform may even be a single element. Generally, however, the platform 16 lies in or can be defined by a single plane, i.e., a plane that is adjustable relative to the ground or relative to the plane in which the second member of the hitch member lies. However, the plane is always perpendicular to the plane formed by the rear of the vehicle 10, i.e., a plane that is perpendicular to ground.

The fastening technique 42 (FIG. 7) includes bolt 53 for attachment of crossing element 46 to platform element 47 through one of a plurality of openings 54 which are available such that adjustment of the crossing elements can be accomplished. The round top bolt 53 is positioned through a lock washer 51 into one end of an elongated nut 52. The fastening technique 42 is utilized at each corner of the generally rectangular platform 16 where the crossing elements 44, 46 are connected to the platform elements 47, 48. As the carrier is mounted over the openings 54, the carrier cannot be removed by removal of the crossing elements 44, 46 without opening of the carrier itself.

Further, for stability, the carrier platform support 15 includes angle elements 19 for connection between a position on platform elements 47 and 48 to support element 18 of T-shaped member 21. A first angle element 19 is connected by a fastening technique, such as bolt 56 and nut 55, to platform element 47 and also to an opening in support element 18 utilizing bolt 58 and nut 56. Likewise, the second angle element 19 is connected to platform element 48 and to the same opening in support element 18 by nut 56 and bolt 58. As such, platform 16 is mounted with stability relative to the T-shaped member 21. Generally, the T-shaped member 21 is connected to platform 16, i.e., such as by welding or other connection mechanisms, at a position offset from the center of the platform 16. The angle elements 19 are then substantially necessary for providing support for the end of platform 16 opposite from the end where the T-shaped member is connected.

For the present invention to be positionable in the various positions as shown in FIGS. 1–3, the T-shaped member 21, i.e., in particular the support element 18, is connected to the platform 16 at an angle less than about 90 degrees relative to platform 16 or the plane in which the platform 16 lies. This angle provides support, particularly for the carrier when positioned at the carrier traveling position as shown in FIG. 2 because in this position the support element 18 is substantially vertical relative to the ground surface. In addition to the support element 18 being substantially vertical relative to the ground providing stability in this carrier traveling position, the carrier 12 is also positioned so as to minimize air resistance.

Figure 8:
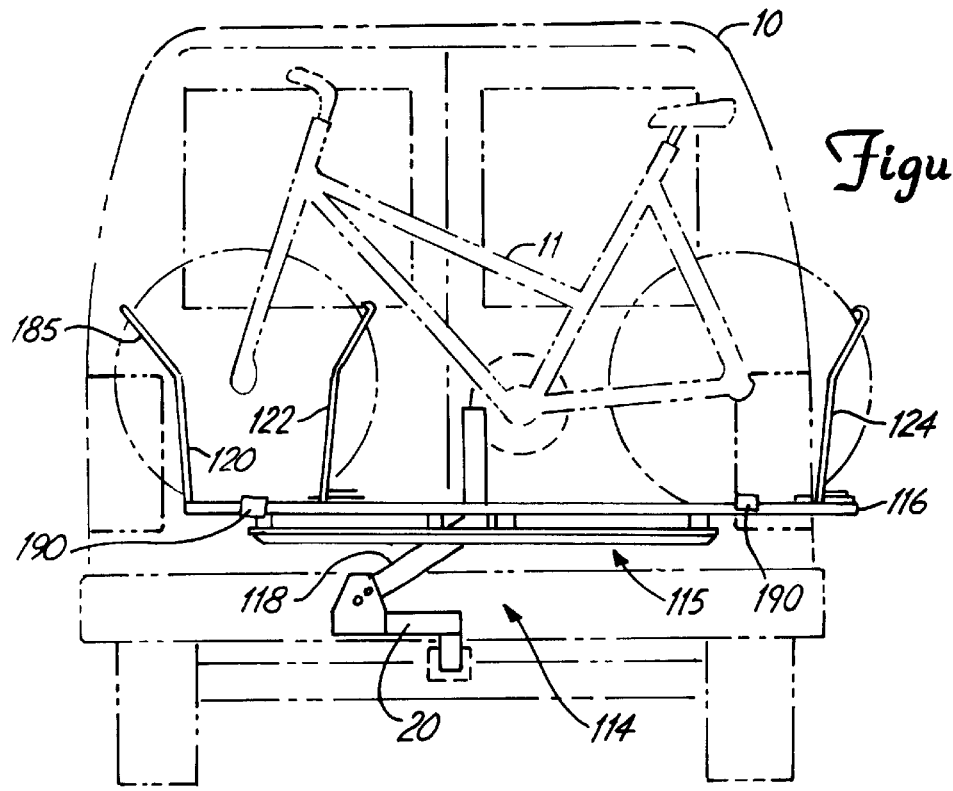
FIG. 8 is a bicycle mounting apparatus in accordance with the present invention mounted at the rear of a vehicle and shown in a loading and traveling position.
Figure 9:
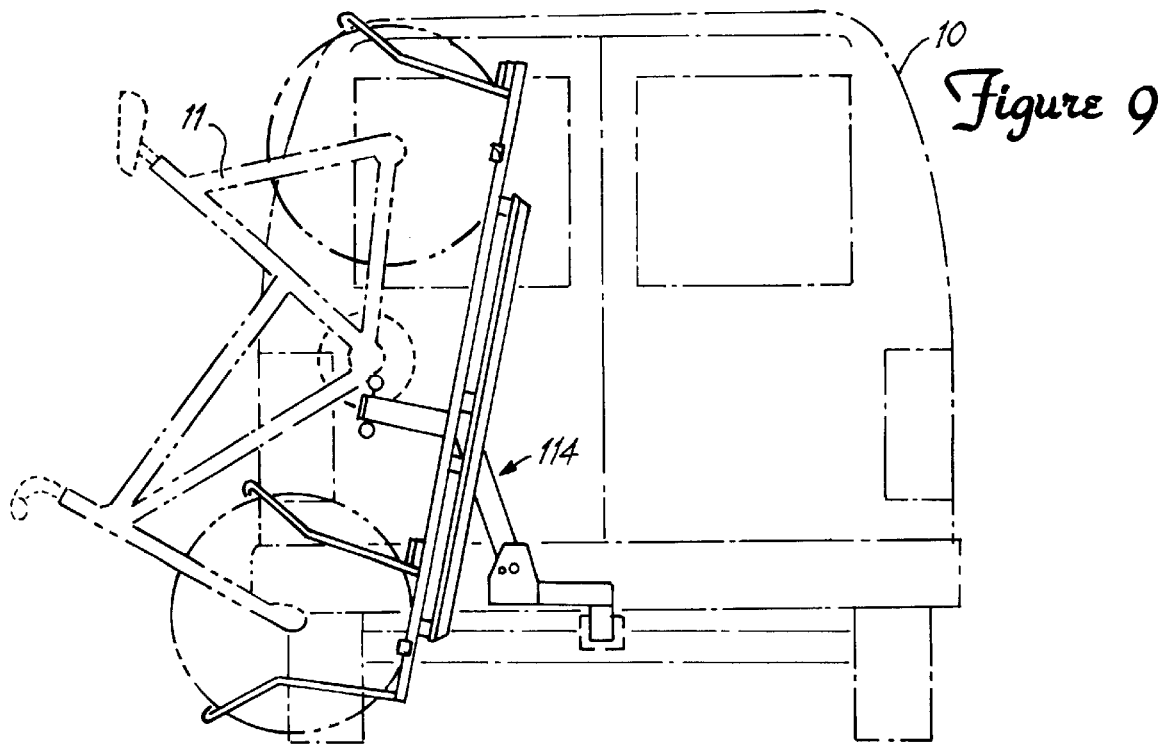
FIG. 9 is the bicycle mounting apparatus of FIG. 8 mounted at the rear of the vehicle and shown in a vehicle entry position.

A bicycle mounting apparatus 114 shall now be described with reference to FIGS. 8–17. The bicycle mounting apparatus 114 includes a substantially identical hitch member 20 as described previously, particularly with reference to FIG. 4. The hitch member is coupled to bicycle platform support 115 of the bicycle mounting apparatus 114 for carrying bicycles in various positions as shown in FIGS. 8 and 9. For example, the bicycles 11 may be carried in a loading and traveling position, as shown in FIG. 8, wherein the platform 116 of platform support 115 is in a generally horizontal position relative to the ground. Further, the bicycles 11 may be held in a vehicle entry position, as shown in FIG. 9, wherein the platform 16 is held in a substantially vertical position relative to the ground by bicycle mounting apparatus 114. In each of these positions, the bicycles are mounted at the rear of vehicle 10. As shown in FIG. 9, with the bicycles 11 mounted in a vehicle entry position, a door of the vehicle 10 may be swung to the side and rearwardly for case of use and entry into the vehicle.

Figure 10:
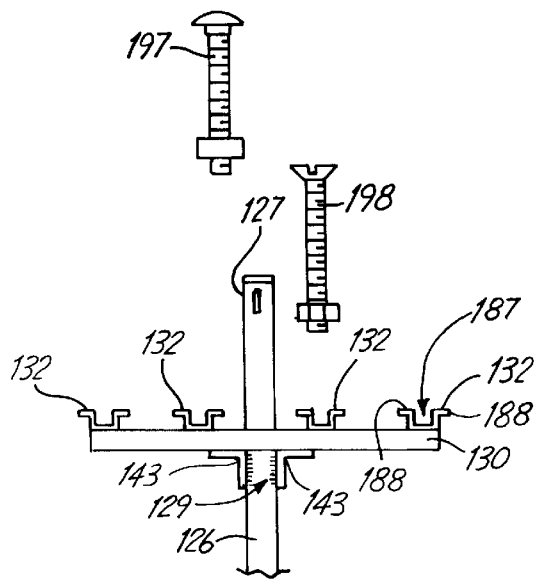
FIG. 10 is an end view of a portion of the bicycle platform support of the bicycle mounting apparatus of FIG. 8 in accordance with the present invention.
Figure 11:
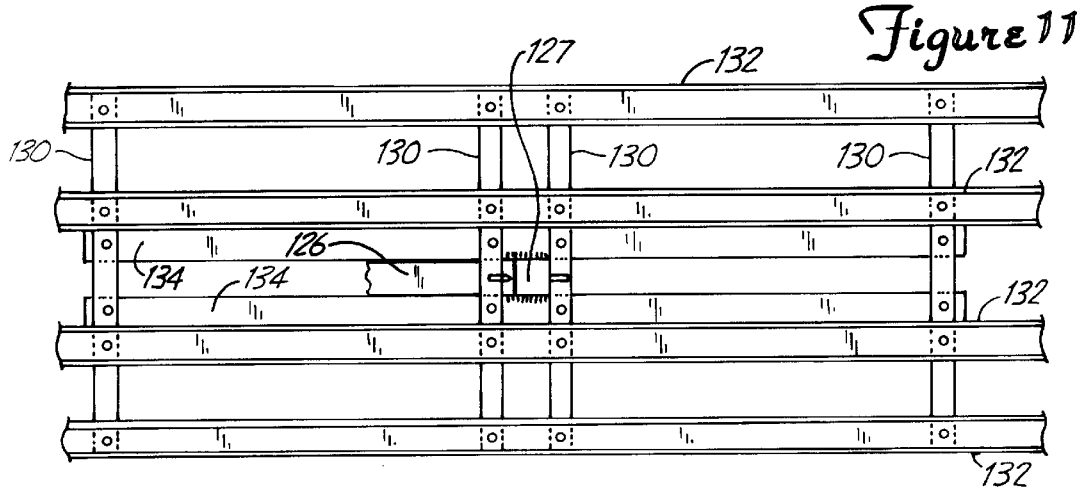
FIG. 11 is a top view of a portion of the bicycle platform support of the bicycle mounting apparatus of FIG. 8 in accordance with the present invention.
Figure 12:
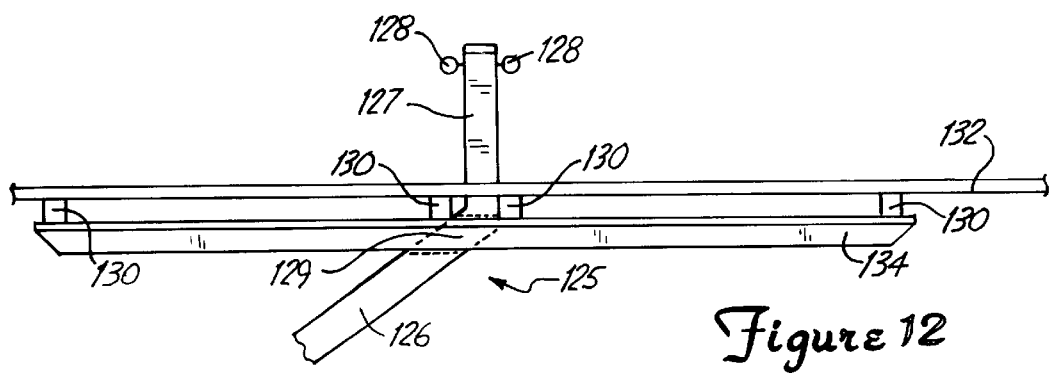
FIG. 12 is a side view of the portion of the bicycle platform support shown in FIG. 11.

As indicated above, the bicycle mounting apparatus 114 includes hitch member 20 as previously described herein with reference to the carrier mounting apparatus 14. The bicycle mounting apparatus 114 further includes the bicycle platform support 115 which includes a generally planar platform 116 shown in further detail, particularly in FIGS. 10–12. As shown in FIGS. 10–12, the bicycle platform support 115 includes a support element 125 (FIG. 12) which at one end is coupled to the position locking and coupling device 26, as previously described with reference to FIG. 4, in substantially the same manner as described with reference thereto. Although described in conjunction with the hitch member 20 herein, the bicycle platform support 115 may be utilized with a variety of hitch member configurations which can be coupled to the support 115 to hold it in a desired position. In one embodiment herein, the hitch member need not be capable for adjustable positioning of the platform 116.

For example, angled member 126 of support member 125 is coupled at one end by openings therein through which locking pin 34 is inserted for rotation about its axis 93 and through which movable positioning pin 23 is positioned for locking the bicycle platform support 115 in a position such as shown in FIGS. 8 and 9. As described with reference to FIGS. 1–7, the position of the bicycle platform support 115 may also be locked in a position substantially anywhere about the 180° freedom of rotation about the axis 93 of locking pin 34 as determined by where angle element 126 is locked using the position locking and coupling device 26.

The hitch member 20 as utilized with the carrier mounting apparatus 14 may differ from the use with the bicycle mounting apparatus in that the position and number of openings in parallel plates 71, 72 may differ. However, for compatibility purposes, such that both the carrier support platform and the bicycle support platform may be used interchangeably, the hitch member is identical.

Support member 125, which includes the angle element 126, further includes a vertical extending member 127 which is utilized for locking the bicycles in place to avoid theft. Attached at respective sides of vertical member 127 are eye hooks 128 for insertion of a chain or other locking mechanism used for security purposes.

The angle element 126 is attached at an angle relative to bicycle platform 116. The angle element 126 is welded to platform support members 134 of bicycle support platform 115 at weld site 129 such that the platform support members 134 are in parallel relationship with one another. As shown in FIG. 8, the angle between the angled member 126 and platform support members 134 is such that the bicycles are carried in a substantially horizontal position. Of course, the angle may be any angle less than 90 degrees. Further, it should be apparent that the element 126 may not have to be angled at all depending upon the coupling configuration of the hitch member. For example, if the bicycle rack were used with a different hitch member, the angled element 126 may extend substantially vertically just like the element 127.

As shown in FIGS. 10–12, the crossing connection members 130 of the platform 116 are mounted across, i.e., perpendicular to, the platform support members 134 at distributed locations. For example, two crossing connection members 130 are mounted at the ends of platform support members 134 and two crossing connection members 130 are connected closer to weld spot 129. It should be readily apparent that any number of crossing connection members 130 may be utilized. The crossing connection members 130 are connected to the platform support members 134 by any suitable fastener elements so as to provide support for channel rails 132 into which tires of bicycle 11 ride.

As illustratively shown in FIG. 11, four channel rails 132 are shown. This allows for the carrying of four bicycles therein. It should be readily apparent that a lesser or greater number of bicycles may be facilitated with use of a lesser or greater number of channel rails 132. However, space constraints may limit the number.

As shown in the end view of FIG. 10, the weld spot 129 is strengthened by bracket elements 143 connected to crossing connection members 130 by suitable fasteners, such as bolts and nuts 197. Further, as shown in the end view of FIG. 10, the channel rails 132 are fastened to the crossing connection members 130 by fasteners, such as bolts and nuts 198. The channel rails 132 shown therein include a channel 187 sized for receiving tires of a bicycle and rails 188 on respective sides thereof.

The bicycle platform support 115 (FIG. 8) further includes a stationary tire restraint 120 which is welded to one end of a channel rail 132 for restraining one tire of a bicycle 11 within the channel 187 of a channel rail 132 at one end portion thereof. The stationary tire restraint 120 generally includes a bended tube 185 sized to restrain the tire of a bicycle 11 within the channel 187. Further included in the bicycle platform support 115 are two moveable tire restraints 122, 124. The moveable tire restraints 122 and 124 are moveable and lockable within a channel rail 132 so as to restrain the tires and thus the bicycle in the channel rail 132.

Figure 17:
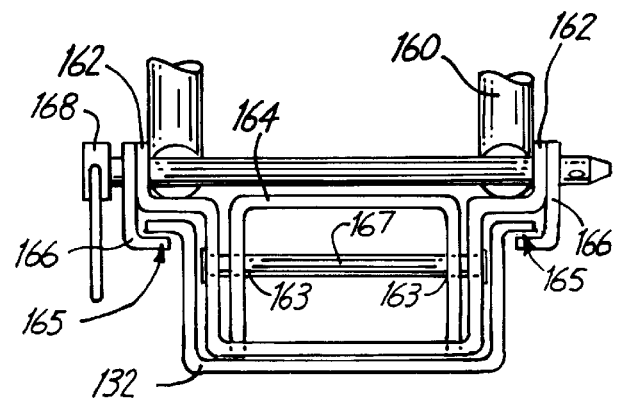
FIG. 17 is an end view of the bicycle tire restraint apparatus of FIG. 13 in a channel rail of the bicycle platform support in accordance with the present invention.

The moveable tire restraints 122, 124 are further described with reference to FIGS. 13–17. As shown in the perspective view of FIG. 13, the moveable tire restraint 124 includes a slide lock portion 162. The slide lock portion 162 includes a channel portion 180 formed by a bottom wall and side walls for defining a channel and sized for insertion into channel rail 132 as shown in FIG. 17. The slide lock portion 162 further includes a clamping surface 166 mounted at the respective sides of channel portion 180 such that an opening 165 between the clamping surface 166 and channel portion 180 is defined for insertion of the rails 188 of a channel rail 132 as shown in FIG. 17. The clamping surfaces 166 are welded to channel portion 180 of the slide lock portion 162.

Figure 14:
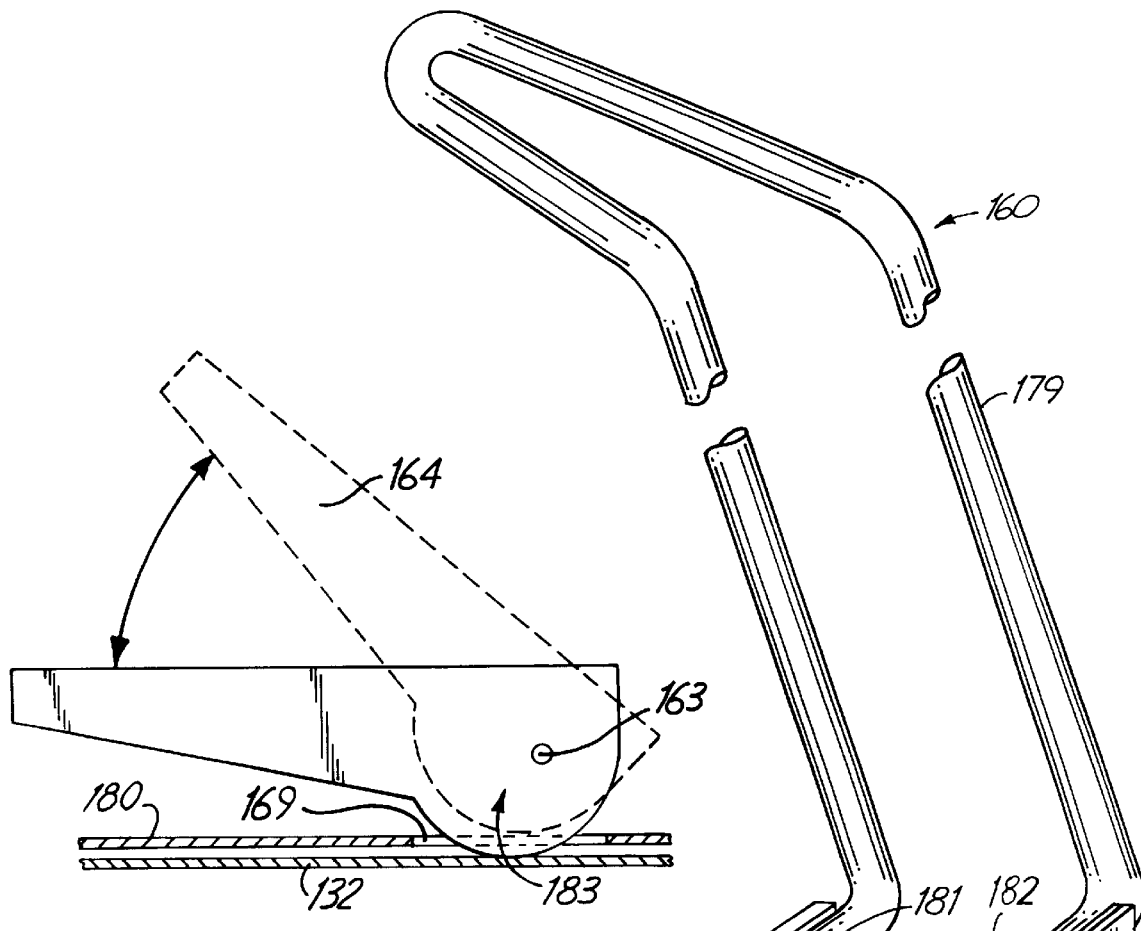
FIG. 14 is a side view of a lever lock used in the moveable bicycle tire restraint apparatus of FIG. 13.
Figure 13:
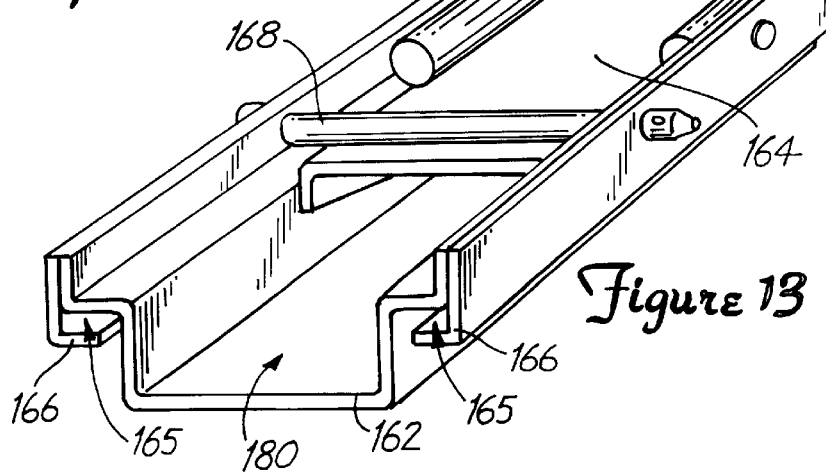
FIG. 13 is a perspective view of a portion of the bicycle tire restraint apparatus of the bicycle mounting apparatus of FIG. 8.
Figure 15:
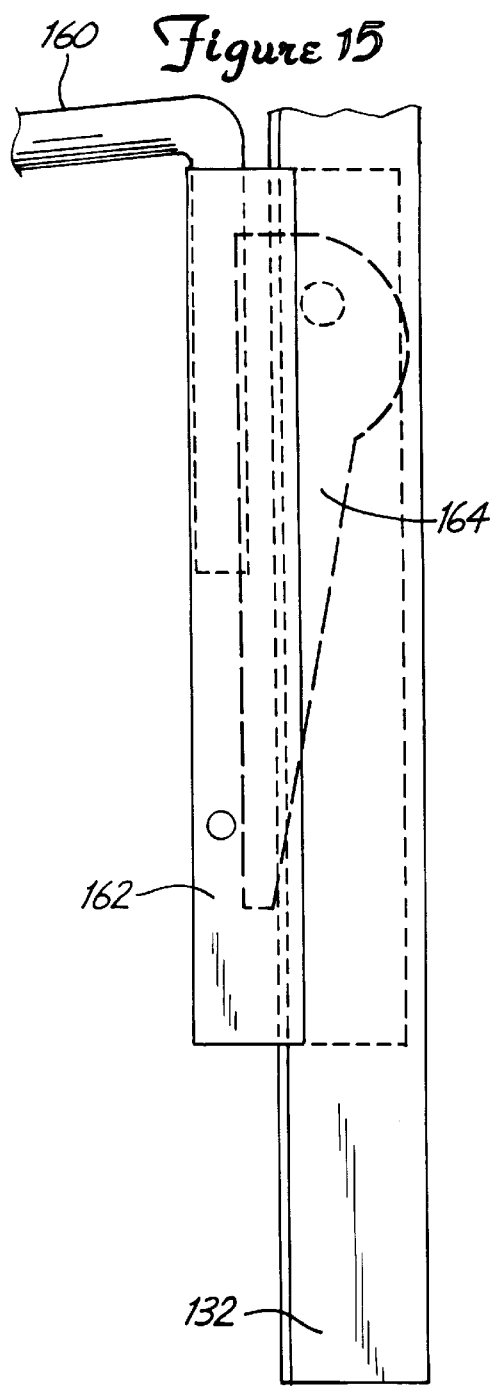
FIG. 15 is a detailed side view of a moveable tire restraint of FIG. 8 in a channel rail of the bicycle platform support in accordance with the present invention.
Figure 16:
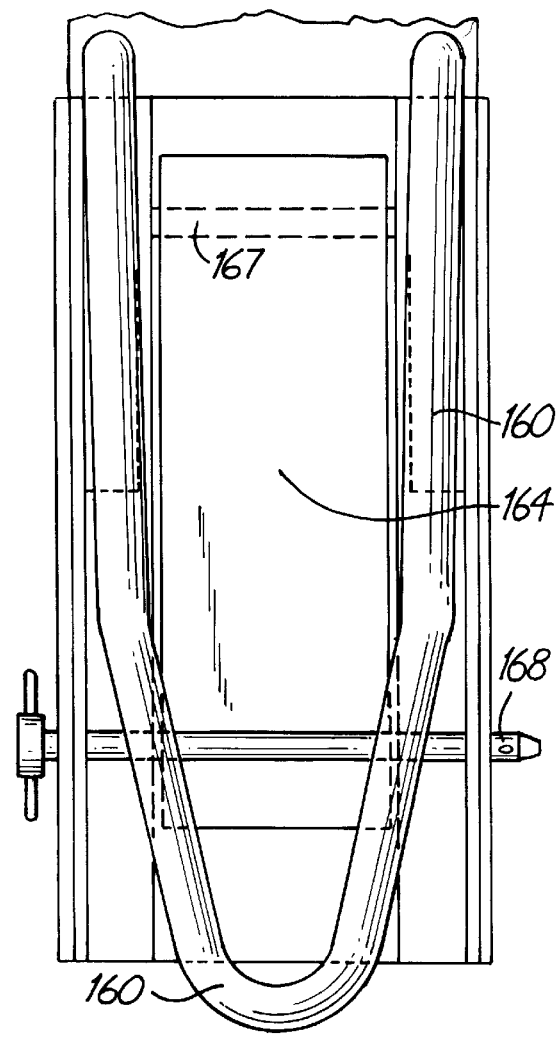
FIG. 16 is a top view of the bicycle tire restraint apparatus of FIG. 13.

The moveable tire restraint 124 further includes a lever lock 164, as best shown in FIG. 14, which is connected to the respective sides of channel portion 180 as shown in FIG. 17 by a pin 167 extending through holes 163 in the lever lock 164 and fixedly connected to the respective side walls of the channel portion 180. Channel portion 180 includes an opening 169 defined in the bottom wall thereof wherein a rounded portion 183 of lever lock 164 may contact channel rail 132 in the closed position. With the rounded portion 183 of the lever lock 164 mounted such that it is offset, i.e., the pin 167 is not at the center of the rounded portion but rather offset from the center, then when the lever lock 164 is pushed downward, the rounded portion extends through the opening 169 in the channel portion 180. As the rounded portion 183 contacts the channel rail 132, the slide lock portion 162 is raised and the clamping surfaces 166 are engaged with the rails 188 of the channel rail 132. The tire restraint 124 is therefore locked into a position within the channel rail 132.

A pin 168 is then inserted into openings in the side walls of the channel portion 162 to keep the lever lock 164 in a closed position and the movable tire restraint 124 locked within the channel rail 132. The lever lock can only be released with the removal of the pin 168.

The moveable tire restraint 124 includes a bent tube member 160 formed so as to have two end portions 181, 182 for welding to respective side walls of channel portion 180. The tube member 160 further includes a loop portion 179 therebetween sized for restraining a tire of the bicycle 11. It will be apparent that various bends may be made in such tube members to facilitate the restraint of the tire.

Moveable tire restraint 122 is substantially identical to that described with respect to tire restraint 124. Further, each channel rail 132 into which a bicycle is positioned has associated stationary tire restraints and moveable tire restraints associated therewith. It should be readily apparent that all the tire restraints may be movable as described above, even stationary restraint 120 may alternatively be configured to be a movable restraint.

With respect to both the carrier mounting apparatus and the bicycle mounting apparatus, generally, the hitch member 20 and the support members 21 and 125 of the respective configurations are formed of a strong material such as steel or metal alloy, i.e., square tubular steel. The remainder of the apparatus of the alternative configurations, such as the bicycle platform support 115 and carrier platform support 15 of the respective configurations, are formed of aluminum or other similar metal. It should be readily apparent that angle elements like those of angle elements 19 as shown with respect to the carrier mounting apparatus 14 may be utilized in conjunction with the bicycle mounting apparatus 114 to provide further stability.

In addition, as shown in FIG. 8, additional hold down straps or belts, such as Velcro straps, may be utilized at positions 190 for further enhancing hold down capability. It should also be recognized that with respect to both embodiments, the position locking and coupling device 26 is positioned at a location offset from the center of the rear of the vehicle as can be generally recognized by the offset of the device 26 from the dash line between the windows of the rear of the vehicle. In this manner, when the respective platform supports 15 and 115 are positioned in the vehicle entry position as shown in FIGS. 3 and 9, the door of the vehicle 10 may be rearwardly swung for ease of use. Further, it shall be recognized that in each respective configuration, the support members 18 and 126 which are rigidly mounted to the platform supported thereby are provided at an angle with respect to such platforms.

It will be recognized that although the invention has been described with particular reference to several embodiments thereof, variations and modifications of the present invention can be made within the contemplated scope of the following claims as is readily know to one skilled in the art.

What is claimed is:

1. A mounting apparatus for use at the rear of a vehicle having a hitch element, a plane is defined at the rear of the vehicle that is perpendicular to the longitudinal axis of the vehicle, the apparatus comprising:

an object support platform, the object support platform including a platform section lying generally in a first plane for positioning of an object thereon, the object support platform further including a support member, the support member including an elongated support element having a first end portion connected to the platform section, the elongated support element extending from the platform section and lying in a second plane that is perpendicular to the first plane and parallel to the plane defined at the rear of the vehicle when the mounting apparatus is in use with the vehicle, the support member further including a second end portion generally opposite the first end portion thereof; and a hitch member, the hitch member including:

a first elongated hitch element having a first end and a second end, the first end of the first elongated hitch element for secure engagement with the hitch element of the vehicle, a second elongated hitch element having a first end connected to the second end of the first elongated hitch element, the second elongated hitch element extends substantially perpendicularly from the first elongated hitch element and lies generally parallel to the plane defined at the rear of the vehicle and parallel to a ground surface which is substantially perpendicular to the plane defined at the rear of the vehicle when the hitch member is engaged with the hitch element of the vehicle, the second elongated hitch element further includes a second end opposite the first end thereof, and a position locking and coupling device connected to a portion of the second elongated hitch element at the second end thereof for adjustable coupling with the second end portion of the elongated support element such that the first plane in which the platform section generally lies is adjustable and lockable to a plurality of positions relative to the ground surface when the hitch member is engaged with the hitch element of the vehicle, wherein at each of the plurality of positions the platform section is generally perpendicular to the plane defined at the rear of the vehicle and is at a different angle relative to the ground surface, and further wherein the first plane in which the platform section generally lies intersects the ground surface at one or more of the locked positions.

2. The apparatus according to claim 1, wherein the elongated support element includes an axis therethrough extending between the first end portion and the second end portion, the axis lies at an angle less than 90 degrees relative to the first plane.

3. The apparatus according to claim 2, wherein the support member of the object support platform includes a T-shaped element, the T-shaped element includes the elongated support element with a crossing member connected at one end thereof, and further wherein the crossing member is connected to the platform section.

4. The apparatus according to claim 1, wherein the position locking and coupling device includes a pair of plates mounted in parallel at respective portions of the second elongated hitch element forming a channel therebetween, each of the parallel plates includes a lock pin opening for insertion of a lock pin therethrough and a plurality of position lock openings for insertion of a positioning pin therethrough.

5. The apparatus according to claim 4, wherein the elongated support element includes a lock pin opening therein such that, when the lock pin is inserted through the lock pin openings in the parallel plates and through the lock pin opening of the elongated support element, the elongated support element is adjustably coupled in the channel for rotation about an axis of the lock pin.

6. The apparatus according to claim 5, wherein the elongated support element further includes an additional position lock opening therethrough such that, when the positioning pin is inserted through a pair of associated position lock openings in the parallel plates and through the additional position lock opening in the elongated support element, the platform section is locked into one of the plurality of positions.

7. The apparatus according to claim 1, wherein the plurality of positions includes a first position wherein the platform section is locked substantially parallel to the ground surface and a second position wherein the platform section is locked substantially vertical relative to the ground surface when the hitch member is engaged with the hitch element of the vehicle, wherein at each position the platform section is substantially perpendicular to the plane defined at the rear of the vehicle.

8. The apparatus according to claim 7, wherein the plurality of positions further include a third position wherein the platform section is locked at an angle relative to the ground surface and the platform section is perpendicular to the plane defined at the rear of the vehicle when the hitch member is engaged with the hitch element of the vehicle.

9. The apparatus according to claim 1, wherein the platform section includes crossing members for mounting an elongated carrier receptacle thereon.

10. The apparatus according to claim 1, wherein the platform section includes at least one channel rail extending from a first end of the platform section to a second end thereof and sized for the positioning of a bicycle tire therein.

11. The apparatus according to claim 10, wherein the platform section further includes one permanent tire restraint positioned for holding a first bicycle tire in a portion of the at least one channel rail at the first end of the platform section and a movable tire restraint, the movable tire restraint being movable relative to the channel rail and lockable to a position therein such that a second tire is held in a portion of the at least one channel rail at the second end of the platform section.

12. A mounting apparatus for use at the rear of a vehicle having a hitch element, a plane is defined at the rear of the vehicle that is perpendicular to the longitudinal axis of the vehicle, the apparatus comprising:
 a support platform lying substantially in a first plane, the support platform for receiving an elongated substantially rectangular carrier receptacle on a receiving side thereof, the support platform being connected to a crossing member of a T-shaped element, the T-shaped element further includes an elongated support element having a first and second end with the crossing member connected at the first end thereof, and further wherein an axis of the elongated support element extends between the first and second ends and lies at an angle less than 90 degrees relative to the first plane and parallel to the plane defined at the rear of the vehicle when in use with the vehicle; and
 a hitch member, the hitch member including a first elongated hitch element having a first end and a second end, the first end for secure engagement with the hitch element of the vehicle, the hitch member further includes a second elongated hitch element, the second elongated hitch element extends perpendicularly from the second end of the first elongated hitch element and lies generally parallel to the plane defined at the rear of the vehicle and generally parallel to a ground surface which is substantially perpendicular to the plane defined at the rear of the vehicle when the hitch member is engaged with the hitch element of the vehicle, the second elongated hitch element terminates in a position locking and coupling device for adjustable coupling with the second end of the elongated support element such that the support platform lying generally in the first plane is adjustable and lockable to a plurality of positions relative to the ground surface when the hitch member is engaged with the hitch element of the vehicle, wherein at each of the plurality of positions the support platform is generally perpendicular to the plane defined at the rear of the vehicle and is at a different angle relative to the ground surface, and further wherein the first plane in which the platform section generally lies intersects the ground surface at one or more of the locked positions.

13. The apparatus according to claim 12, wherein the position locking and coupling device includes a pair of plates mounted in parallel at respective portions at the second end of the second elongated hitch element forming a channel therebetween, each of the parallel plates includes a lock pin opening for insertion of a lock pin therethrough and a plurality of position lock openings for insertion of a positioning pin therethrough.

14. The apparatus according to claim 13, wherein the elongated support element includes a lock pin opening therein such that, when the lock pin is inserted through the lock pin openings in the parallel plates and through the lock pin opening of the elongated support element, the elongated support element is adjustably coupled to the hitch member in the channel for rotation about an axis of the lock pin.

15. The apparatus according to claim 14, wherein the elongated support element further includes an additional position lock opening therethrough such that, when the positioning pin is inserted through a pair of associated position lock openings in the parallel plates and through the additional position lock opening, the support platform is locked into one of the plurality of positions.

16. The apparatus according to claim 12, wherein the plurality of positions includes a first position wherein the support platform is locked substantially parallel to the ground surface and a second position wherein the support platform is locked substantially vertical relative to the ground surface when the hitch member is engaged with the hitch element of the vehicle.

17. The apparatus according to claim 16, wherein the plurality of positions further include a third position wherein the support platform is locked at an angle relative to the ground surface when the hitch member is engaged with the hitch element of the vehicle.

18. A method of mounting objects at the rear of a vehicle having a hitch element, a plane is defined at the rear of the vehicle that is perpendicular to the longitudinal axis of the vehicle, the method comprising the steps of:
 engaging a first end portion of a hitch member with the hitch element of the vehicle, the hitch member further including a position locking and coupling device; and
 adjustably coupling a support member extending from a platform section with the position locking and coupling device such that the platform section generally defined by a first plane is adjustable and lockable to a plurality of positions relative to a ground surface which is substantially perpendicular to the plane defined at the rear of the vehicle, wherein the platform section receives an elongated substantially rectangular carrier receptacle on a receiving side thereof, wherein the platform section generally defined by the first plane with the carrier receptacle received thereon is perpendicular to the plane defined at the rear of the vehicle and is at a different angle relative to the ground surface at each of the plurality of positions, and further wherein the first plane in which the platform section generally lies intersects the ground surface at one or more of the locked positions, and further wherein the plurality of positions includes a first position wherein the platform section is substantially parallel to the ground surface and a second position wherein the platform section is substantially vertical relative to the ground surface, wherein the plurality of positions further includes a traveling position, wherein in the traveling position the angle of the platform section relative to the ground surface is between the angle of the platform section in the first position and the angle of the platform section in the second position, and further wherein at each position the platform section is perpendicular to the plane defined at the rear of the vehicle.

\* \* \* \* \*